March 2, 1943. H. L. GENTIL 2,312,811
DISTILLATION AND CONDENSATION OF METALS
Filed Oct. 8, 1941 2 Sheets-Sheet 2
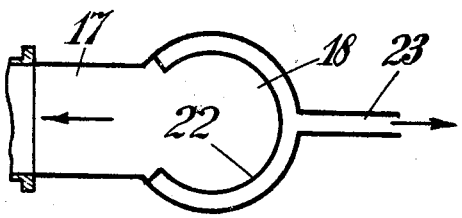
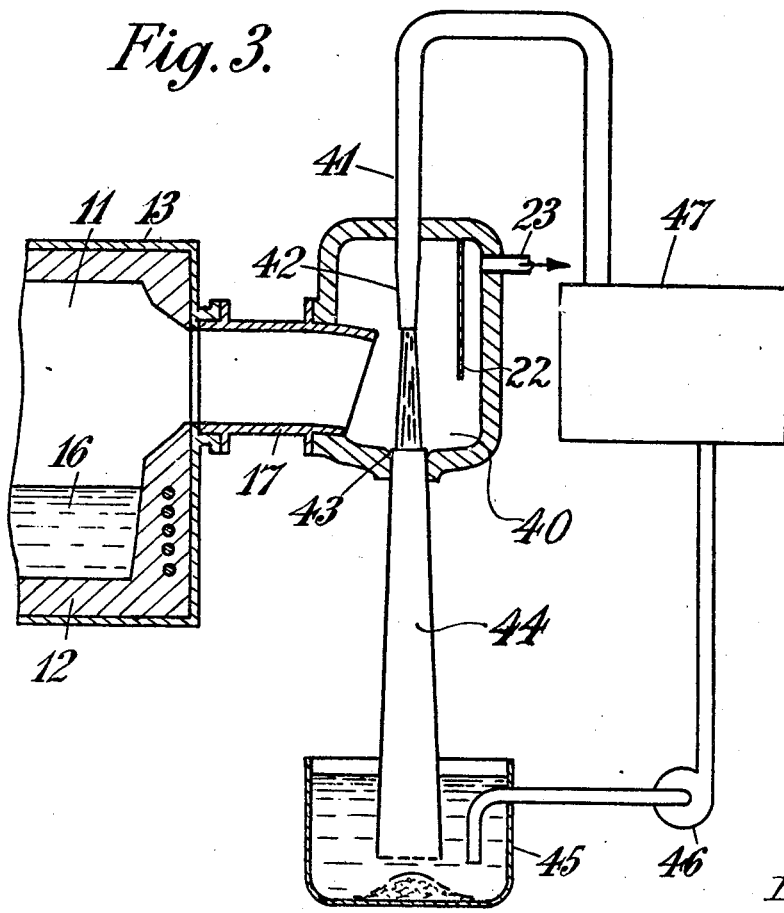

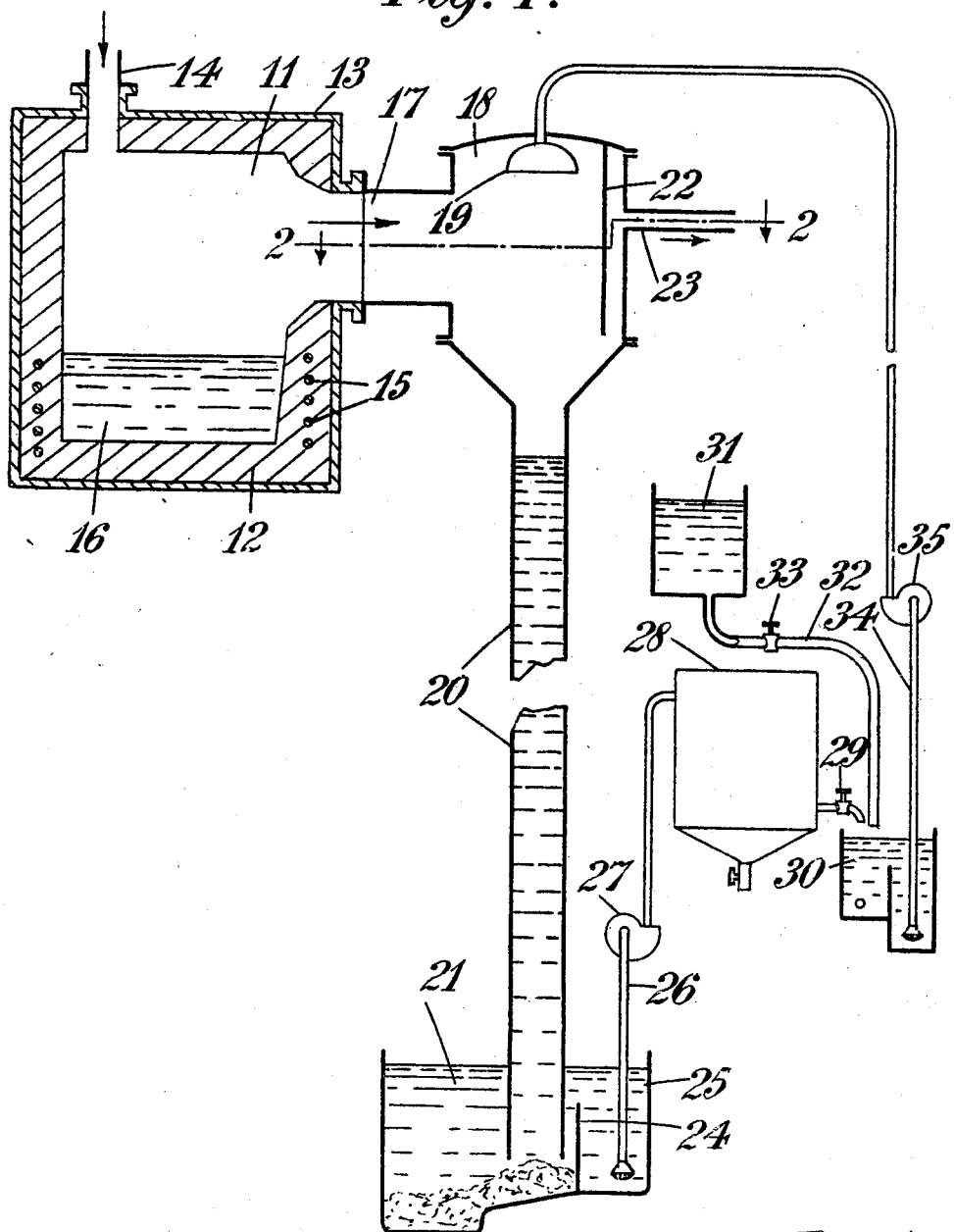

Patented Mar. 2, 1943

2,312,811

UNITED STATES PATENT OFFICE 2,312,811

DISTILLATION AND CONDENSATION OF METALS

Henri Louis Gentil, Cardif, Wales, assignor to Alloy Processes Limited, Alderbourne, Buckinghamshire, England, a British company Application October 8, 1941, Serial No. 414,200
In Great Britain May 31, 1940

5 Claims. (Cl. 266—19)

This application corresponds to the application of Alloy Processes Limited and Henri Louis Gentil, Serial No. 9554/40, which was filed in Great Britain May 31, 1940.

This invention comprises improvements in or relating to the distillation and condensation of metals.

It is known to distil and condense metals under a vacuum.

In effecting condensation of metals under a vacuum the problems arise of the rapid and effective abstraction of heat from the vapours, so as to lead to the condensation of the metal, and of the removal of the condensed metal from the condensation chamber, without interfering with the vacuum which is maintained there.

According to the present invention condensation is effected in a jet condenser, utilising as the condensing liquid a liquid of low vapour pressure.

As the liquid of low vapour pressure there may be utilised for example an oil of high boiling point, which is injected into the condensing chamber in the form of a jet or jets, and which is thereupon withdrawn from the chamber along with the condensed metal which collects in the oil, and is thereafter, cooled and recirculated.

The invention comprises a process of recovery of metal in a pure form, consisting in distilling the metal in a distillation furnace, leading metallic vapours from the furnace into a condensation chamber contiguous thereto, condensing the vapours in the chamber by introducing cooling liquid of low vapour pressure into the chamber as a jet or jets, withdrawing the liquid and the condensed metal from the chamber, separating them, cooling and recirculating the liquid so as to condense more metal.

The invention further comprises apparatus for carrying the process into effect as hereinafter described.

The following is a description by way of example of one form of apparatus, and of the process as carried out therein.

In the accompanying drawings:

Figure 1 is a diagrammatic representation of the apparatus.

Figure 2 is a cross-section upon the line 2—2 of Figure 1, looking in the direction of the arrows, and Figure 3 is a diagram of an alternative construction.

The apparatus comprises a furnace 11, Figure 1, lined with a refractory material 12, and provided with a vacuum-tight casing 13. The furnace has a charging opening 14, through which material to be treated can be introduced continuously or otherwise as desired, and this charging opening must be provided with a suitable air lock, whereby inlet of atmospheric air is prevented during the charging operation, which may be either continuous or intermittent as desired. Electrical heating means 15 is provided, and thereby the charge 16 is raised to volatilisation temperature. Metallic vapours pass away through the outlet 17 to a condensing chamber 18. The condensing chamber is provided with a spraying device 19, through which condensing liquid may be introduced into the chamber, and in its lower part it has a leg 20 of sufficient length to constitute a barometric column. The lower end of the column 20 dips into a sump 21.

The condensing chamber 18 is circular as viewed in plan, and is provided with an inner wall 22, which is spaced from the outer wall and extends around the inside thereof for the greater part of its circumference, as best seen in Figure 2, so as to provide a jacket-space which protects the walls of the condensing chamber from the impact of the metallic vapours, and avoids condensation of metal thereon. The jacket wall 22 also constitutes a baffle, and behind the baffle there is an outlet 23 to a vacuum pump, which during operation of the furnace is kept continuously in use, so as to ensure that the apparatus is under the necessary vacuum, to keep distillation actively proceeding at a suitable temperature for the metal in question.

The sump 21 when the apparatus is in use, receives not only condenser liquid, but also mixed therewith condensed metal, which descends through the barometric column with the liquid, and collects in the bottom of the sump. The sump has an internal division wall 24, the upper edge of which is below the level of the liquid in the sump, so that the condensed metal is kept to one side of the division wall 24, while the condensing liquid can flow over the division wall to a separate collection chamber 25. In the chamber 25 is a suction pipe 26 of a pump 27, which withdraws the condensing liquid, and delivers it to a refrigerator 28. From the refrigerator the cooled liquid passes by a cock 29 to an intermediate receiver 30 where it is stored, and where additional quantities of fresh oil can be added if desired from a head tank 31, through an inlet pipe 32, controlled by a valve 33. From the receiver 30 there extends a suction pipe 34 to a second pump 35, which delivers by pipe 36 to the sprayer 19, and thus the cooled condensing liquid can be re-circulated.

The condensed metal can be recovered as desired from the sump 21.

It will thus be seen that the metal is removed from the condenser without in any way interfering with the vacuum in the chamber 18, and the condensing liquid is continuously withdrawn from the sump 21 and re-used. Thus, the condensing process is continuous, and the removal of metal from the condensing chamber is also continuous, and both can be effected without interfering with the vacuum.

As an alternative instead of using a column of oil sufficiently high to counteract the barometric pressure, the outlet pipe of the condenser could be constructed as a Venturi tube, so that part or all of the energy required for carrying the oil and condensed metal out of the condensing chamber against the atmospheric pressure, is obtained by the conversion of the kinetic energy of the liquid into pressure in the Venturi tube.

Such a construction is illustrated in Figure 3, in which 11 represents the furnace as in the case of Figure 1. This has an outlet 17 to a condensing chamber 40. Oil is injected into the condensing chamber through a pipe 41, and it issues from the pipe through a nozzle 42, which is concentric with an outlet 43. The outlet 43 is flared outwardly as shown in the drawings, and the device acts as an ejector condenser, in which the out-going fluid acquires a pressure, while it loses velocity in the Venturi tube 44. The tube delivers to a sump 45, and the oil is re-circulated by a pump 46, through a cooling device 47. The cooling devices may be similar to what is described in connection with Figures 1 and 2, and the same applies to the furnace 11. The details of this part of the apparatus are therefore not shown in Figure 3.

It will be understood that the condensing liquid to be employed may be one of the known oils, having a very low vapour pressure and high boiling point, and for this purpose it is possible to utilise oils, such as are employed in the lubrication of engines using high pressure superheated steam.

I claim:

1. Apparatus for the distillation and condensation of metals comprising in combination a furnace chamber having a vacuum-tight casing, means to heat the chamber, a metallic-vapour outlet in the upper part of said chamber, a condensation chamber connected to the metallic-vapour outlet, a collecting column depending from the condensation chamber, a sump at the bottom of the column and means for circulating cooling liquid out of said chamber through the column from the sump and back to the chamber, a spraying device for distribution of cooling liquid in the chamber, a baffle behind the spraying device, and an outlet behind the baffle to a vacuum pump.

2. Apparatus for the distillation and condensation of metals comprising in combination a furnace chamber having a vacuum-tight casing, means to heat the chamber, a metallic-vapour outlet in the upper part of said chamber, a condensation chamber connected to the metallic-vapour outlet, a collecting column depending from the condensation chamber, a sump at the bottom of the column and means for circulating cooling liquid out of said chamber through the column for the sump and back to the chamber, a spraying device for distribution of cooling liquid in jet form into the chamber, a baffle within the chamber constituted by an inner wall of the chamber which is spaced from the outer wall thereof, and extends over the greater part of the area of the outer wall, so as to provide between the baffle and the outer wall a jacket-space.

3. Apparatus for the distillation and condensation of metals comprising in combination a furnace chamber having a vacuum-tight casing, means to heat the chamber, a metallic-vapour outlet in the upper part of said chamber, a condensation chamber connected to the metallic-vapour outlet, a column of expanding cross-section depending from said condensation chamber, means for directing a jet of cooling liquid into the open mouth of said column for condensing and ejecting the vapours, and a sump at the bottom of said column.

4. Apparatus for the distillation and condensation of metals comprising in combination a furnace chamber having a vacuum-tight casing, means to heat the chamber, a metallic-vapour outlet in the upper part of said chamber, a condensation chamber connected to the metallic-vapour outlet, a Venturi outlet column depending from said condensation chamber, means for directing a jet of cooling liquid into the open mouth of said column for condensing and ejecting the vapours, a sump at the bottom of said column, and means for circulating cooling liquid out of said chamber and through said jet directing means from the sump, and back to said condensation chamber.

5. Apparatus for the distillation and condensation of metals comprising in combination a furnace chamber having a vacuum-tight casing, means to heat the chamber, a metallic-vapour outlet in the upper part of said chamber, a condensation chamber connected to the metallic-vapour outlet, means for connecting said apparatus including the furnace and the condensation chamber with a source of sub-atmospheric pressure, a Venturi outlet column depending from said condensation chamber, means for directing a jet of cooling liquid into the open mouth of said column for condensing and ejecting the vapours, while maintaining sub-atmospheric pressure in the apparatus, and a sump at the bottom of said column.

HENRI LOUIS GENTIL.